United States Patent
Zhou et al.

(10) Patent No.: US 10,176,405 B1
(45) Date of Patent: Jan. 8, 2019

(54) VEHICLE RE-IDENTIFICATION TECHNIQUES USING NEURAL NETWORKS FOR IMAGE ANALYSIS, VIEWPOINT-AWARE PATTERN RECOGNITION, AND GENERATION OF MULTI- VIEW VEHICLE REPRESENTATIONS

(71) Applicant: Inception Institute of Artificial Intelligence, Al Maryah Island, Abu Dhabi (AE)

(72) Inventors: Yi Zhou, Abu Dhabi (AE); Ling Shao, Abu Dhabi (AE)

(73) Assignee: INCEPTION INSTITUTE OF ARTIFICIAL INTELLIGENCE (AE)

( * ) Notice: Subject to any disclaimer, the term of this patent is extended or adjusted under 35 U.S.C. 154(b) by 0 days.

(21) Appl. No.: 16/010,832

(22) Filed: Jun. 18, 2018

(51) Int. Cl.
   *G06K 9/00* (2006.01)
   *G06K 9/62* (2006.01)
   (Continued)

(52) U.S. Cl.
   CPC ....... *G06K 9/6269* (2013.01); *G06K 9/00718* (2013.01); *G06K 9/00771* (2013.01);
   (Continued)

(58) Field of Classification Search
   CPC .. G06K 9/6269; G06K 9/6201; G06K 9/6256; G06K 9/6218; G06K 9/00771;
   (Continued)

(56) References Cited

U.S. PATENT DOCUMENTS

| 8,983,133 B2 | 3/2015 | Feris et al. |
| 9,239,955 B2 | 1/2016 | Bhanu et al. |

(Continued)

FOREIGN PATENT DOCUMENTS

| CN | 106570477 | 4/2017 |
| WO | 2017180944 | 10/2017 |

(Continued)

OTHER PUBLICATIONS

Yang et al, ("A large-scale car dataset for fine-Grained categorization and verification", IEEE 2015).*

(Continued)

*Primary Examiner* — Amara Abdi
(74) *Attorney, Agent, or Firm* — Bryan Cave Leighton Paisner LLP

(57) ABSTRACT

This disclosure relates to improved vehicle re-identification techniques. The techniques described herein utilize artificial intelligence (AI) and machine learning functions to re-identify vehicles across multiple cameras. Vehicle re-identification can be performed using an image of the vehicle that is captured from any single viewpoint. Attention maps may be generated that identify regions of the vehicle that include visual patterns that overlap between the viewpoint of the captured image and one or more additional viewpoints. The attention maps are used to generate a multi-view representation of the vehicle that provides a global view of the vehicle across multiple viewpoints. The multi-view representation of the vehicle can then be compared to previously captured image data to perform vehicle re-identification.

20 Claims, 6 Drawing Sheets

(51) Int. Cl.
*H04N 7/18* (2006.01)
*G06T 7/246* (2017.01)
*G06T 7/73* (2017.01)

(52) U.S. Cl.
CPC ....... *G06K 9/00785* (2013.01); *G06K 9/6201* (2013.01); *G06K 9/6218* (2013.01); *G06K 9/6256* (2013.01); *G06T 7/246* (2017.01); *G06T 7/73* (2017.01); *H04N 7/181* (2013.01); *G06K 2209/23* (2013.01); *G06T 2207/10016* (2013.01); *G06T 2207/20081* (2013.01)

(58) Field of Classification Search
CPC ........... G06K 9/00718; G06K 9/00785; G06K 2209/23; G06T 2207/10016; G06T 2207/20081; G06T 7/73; G06T 7/246; H04N 7/181
See application file for complete search history.

(56) References Cited

U.S. PATENT DOCUMENTS

| | | |
|---|---|---|
| 9,396,403 B2 | 7/2016 | Karkowski et al. |
| 9,911,056 B2 | 3/2018 | Haselhoff et al. |
| 9,953,245 B2 | 4/2018 | Palacio et al. |
| 2017/0097944 A1 | 4/2017 | Bhanu et al. |
| 2017/0140247 A1 | 5/2017 | Yoo et al. |
| 2018/0005079 A1* | 1/2018 | Tosic ............... G06N 3/08 |

FOREIGN PATENT DOCUMENTS

| | | | | |
|---|---|---|---|---|
| WO | WO-2017180944 A1 * | 10/2017 | ............... | G06F 7/00 |
| WO | 2017220032 | 12/2017 | | |
| WO | WO-2017220032 A1 * | 12/2017 | ............... | G06K 9/62 |

OTHER PUBLICATIONS

Yi Zhou ("Cross-view GAN based vehicle generation for re-identification", School of computing sciences, university of East Anglia, Norwich, UK, 2017).*
S. Bai, et al. "Scalable person re-identification on supervised smoothed manifold," In The IEEE Conference on CVPR, 2017.
W. Chen, et al. "Beyond triplet loss: A deep quadruplet network for person re-identification," In The IEEE Conference on CVPR, 2017.
X. Chen, et al. "Infogan: Interpretable representation learning by information maximizing generative adversarial nets," In Advances in Neural Information Processing Systems, pp. 2172-2180, 2016.
J. Fu, et al. "Look closer to see better: Recurrent attention convolutional neural network for fine-grained image recognition," In The IEEE Conference on CVPR, 2017.
S. Gong, et al. Person re-identification, vol. 1. 2014.
I. Goodfellow, et al. "Generative adversarial nets," In Advances in NIPS, pp. 2672-2680, 2014.
R. Hadsell, et al. "Dimensionality reduction by learning an invariant mapping," In 2006 IEEE Computer Society Conference on Computer Vision and Pattern Recognition, vol. 2, pp. 1735-1742, 2006.
K. He, et al. "Identity mappings in deep residual networks," In ECCV, pp. 630-645. Springer, 2016.
P. Isola, et al. "Image-to-image translation with conditional adversarial networks," In IEEE Conference on CVPR, 2017.
D. Li, et al. "Learning deep context-aware features over body and latent parts for person re-identification," In The IEEE Conference on CVPR, 2017.
S. Liao, et al. "Person re-identification by local maximal occurrence representation and metric learning," In IEEE Conference on CVPR, pp. 2197-2206, 2015.
J. Lin, et al. "Consistent-aware deep learning for person re-identification in a camera network," In The IEEE Conference on CVPR, 2017.

H. Liu, et al. "Deep relative distance learning: Tell the difference between similar vehicles," In IEEE Conference on CVPR, pp. 2167-2175, 2016.
X. Liu, et al. "Large-scale vehicle re-identification in urban surveillance videos," In Multimedia and Expo (ICME), 2016 IEEE International Conference on, pp. 1-6, 2016.
X. Liu, et al. "A deep learning-based approach to progressive vehicle re-identification for urban surveillance," In ECCV, pp. 869-884. Springer, 2016.
V. Mnih, et al. "Recurrent models of visual attention," In Advances in NIPS, pp. 2204-2212, 2014.
A. Odena, et al. "Conditional image synthesis with auxiliary classifier GANs," In Proceedings of The International Conference on Machine Learning, pp. 2642-2651, 2017.
M. Pedersoli, et al. "Areas of attention for image captioning," In The IEEE ICCV, 2017.
X. Qian, et al. "Multi-scale deep learning architectures for person re-identification," In The IEEE ICCV, 2017.
A. Radford, et al. "Unsupervised representation learning with deep convolutional generative adversarial networks," In International Conference on Learning Representations, 2016.
Y. Rao, et al. "Attention-aware deep reinforcement learning for video face recognition," In The IEEE ICCV, 2017.
T. Salimans, et al. "Improved techniques for training gans," In Advances in NIPS, pp. 2234-2242, 2016.
Y. Shen, et al. "Learning deep neural networks for vehicle re-id with visual-spatio-temporal path proposals," In The IEEE ICC), 2017.
C. Su, et al. "Pose-driven deep convolutional model for person re-identification," In The IEEE ICCV, 2017.
F. Wang, et al. "Residual attention network for image classification," In The IEEE Conference on CVPR, 2017.
Z. Wang, et al. "Orientation invariant feature embedding and spatial temporal regularization for vehicle re-identification," In The IEEE ICCV, 2017.
A. Wu, et al. "Rgb-infrared cross-modality person re-identification," In The IEEE ICCV, 2017.
T. Xiao, et al. "Learning deep feature representations with domain guided dropout for person re-identification," In The IEEE Conference on CVPR, 2016.
L. Yang, et al. "A large-scale car dataset for fine-grained categorization and verification," In Proceedings of The IEEE Conference on CVPR, pp. 3973-3981, 2015.
H.-X. Yu, et al. "Cross-view asymmetric metric learning for unsupervised person re-identification," In The IEEE ICCV, 2017.
L. Zhang, et al. "Learning a discriminative null space for person re-identification," In The IEEE Conference on CVPR, 2016.
Y. Zhang, et al. "Sample-specific svm learning for person re-identification," In The IEEE Conference on CVPR, 2016.
H. Zhao, et al. "Spindle net: Person re-identification with human body region guided feature decomposition and fusion," In The IEEE Conference on CVPR, 2017.
L. Zhao, et al. "Deeply-learned part-aligned representations for person re-identification," In The IEEE ICCV, 2017.
H. Zheng, et al. "Learning multi-attention convolutional neural network for fine-grained image recognition," In The IEEE ICCV, 2017.
L. Zheng, et al. "Person re-identification in the wild," In The IEEE Conference on CVPR, 2017.
Z. Zhong, et al. "Re-ranking person re-identification with k-reciprocal encoding," In The IEEE Conference on CVPR, 2017.
J. Zhou, et al. "Efficient online local metric adaptation via negative samples for person re-identification," In The IEEE ICCV, 2017.
S. Zhou, et al. "Point to set similarity based deep feature learning for person re-identification," In The IEEE Conference on CVPR, 2017.
Y. Zhou, et al. "Cross-view gan based vehicle generation for re-identification," In Proceedings of the British Machine Vision Conference (BMVC). BMVA Press, 2017.
C. Zhu, et al. "Structured attentions for visual question answering," In The IEEE ICCV, 2017.
J.-Y. Zhu, et al. "Unpaired image-to-image translation using cycle-consistent adversarial networks," In The IEEE ICCV, 2017.

(56) References Cited

OTHER PUBLICATIONS

Shen, et al. "Learning Deep Neural Networks for Vehicle Re-ID with Visual-Spatio-Temporal Path Proposals," Dept. of Electronic Engineering, The Chinese Univsersity of Hong Kong May 2018.
Gazzah et al. "Vehicle Re-Idenfication in Camera Networks: A Review and New Perspectives," ACIT 2017.

\* cited by examiner

VEHICLE RE-IDENTIFICATION TECHNIQUES USING NEURAL NETWORKS FOR IMAGE ANALYSIS, VIEWPOINT-AWARE PATTERN RECOGNITION, AND GENERATION OF MULTI- VIEW VEHICLE REPRESENTATIONS

TECHNICAL FIELD

This disclosure is related to improved vehicle re-identification techniques and, more particularly, to vehicle re-identification techniques that utilize trained neural networks and artificial intelligence (AI) algorithms to infer multi-view representations of vehicles from a single viewpoint.

BACKGROUND

Generally speaking, vehicle re-identification ("vehicle re-ID") is a technology that aims to identify a vehicle of interest across images taken by multiple cameras. For example, after a vehicle has been captured by a first camera and has exited the field-of-view (FOV) of the first camera, vehicle re-identification technologies attempt to re-identify the vehicle when it enters the FOV of other cameras. This technology is useful in a variety of different contexts, such as surveillance systems and intelligent transportation systems.

Various technical obstacles impede the implementation of an effective and accurate vehicle re-identification solution. One technical challenge relates to tracking a vehicle across multiple cameras when the views of the multiple cameras do not overlap with one another and/or when the vehicle is captured from different viewpoints. When the views of the cameras do not overlap, the camera system cannot directly track the path of the vehicle and must be able to re-identify the vehicle when it reappears in the FOV of other cameras. However, a vehicle captured from different viewpoints usually has a dramatically different visual appearance in each of the viewpoints. For example, consider the scenario in which a first camera captures an image of the vehicle from a rear viewpoint and a second camera captures another image of the vehicle from a side viewpoint. The task of matching the vehicles in the images is difficult because the visual appearance of the vehicle varies greatly between the two images. Another technical difficulty associated with vehicle re-identification relates to distinguishing between similar vehicles that are captured from the same viewpoint. For example, consider another scenario in which two different vehicles of the same color and model are captured in images taken from the same viewpoint. In this case, the task of matching the vehicles in the images is difficult given the similar visual appearances of the vehicle in the images.

Many conventional vehicle re-identification methods rely on license plate recognition (LPR) techniques or spatial-temporal tracking methods (e.g., which utilize timing information to try to track and identify vehicles) to address the vehicle re-identification task. However, these conventional methods are not practical in many real-world situations. For example, LPR-based re-identification methods typically require images to be taken from specific viewpoints (i.e., either the front or rear viewpoint) and the images must be captured using high-resolution cameras. These obstacles prevent vehicle re-identification technologies from being integrated into existing systems which do not have high-resolution equipment, or which do not have cameras situated at the appropriate viewpoints. With respect to spatial-temporal tracking methods, many camera systems are not configured to generate spatial-temporal information or to process it in any meaningful way. Retrofitting an existing camera system to track and process spatial-temporal information can require extensive upgrades to the camera equipment and/or software running on the back-end of the system.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

Figure 1:
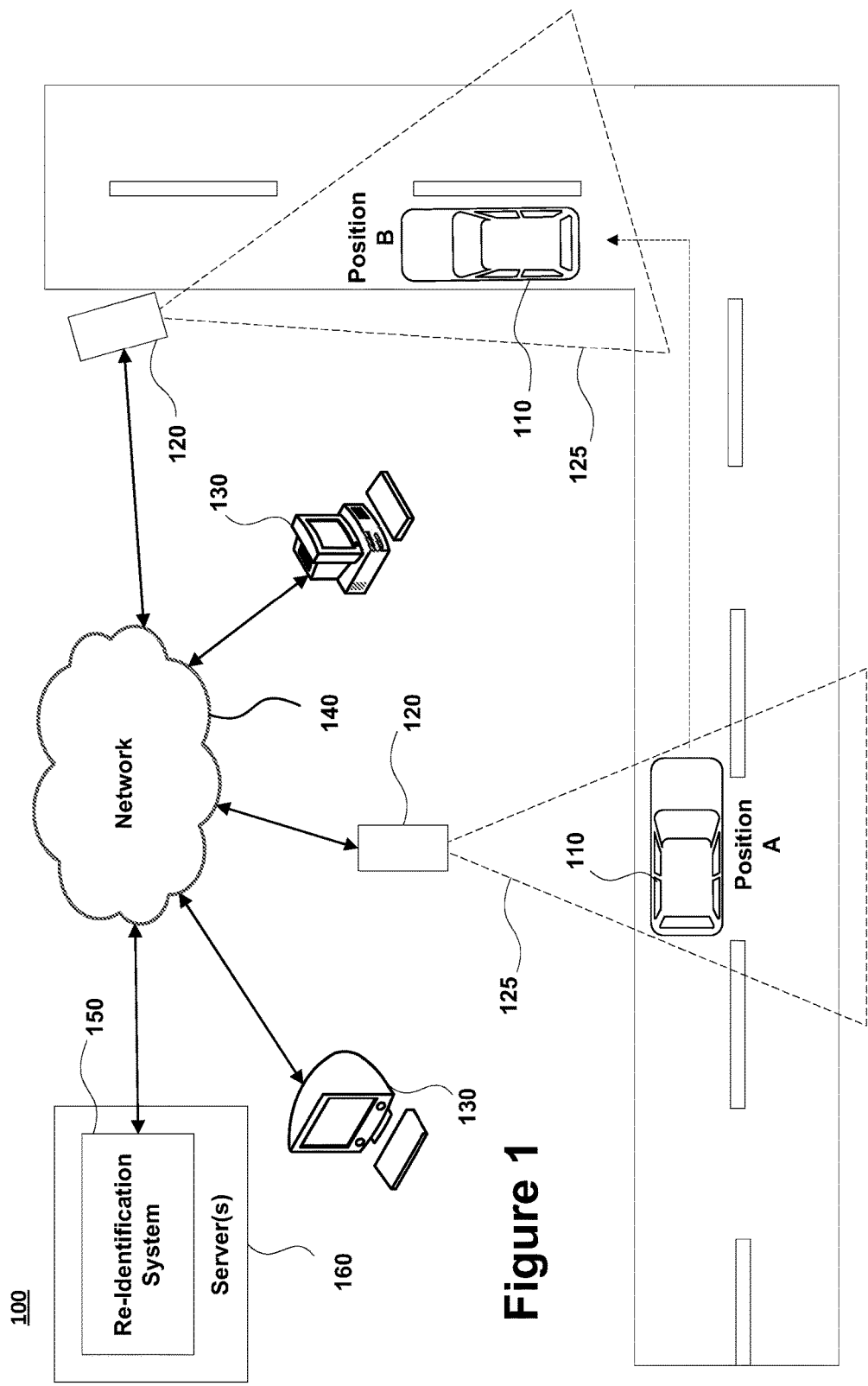
FIG. 1 is a diagram of an exemplary system for tracking and/or re-identifying vehicles in accordance with certain embodiments.

The present disclosure relates to systems, methods, and apparatuses that are configured to implement improved vehicle re-identification techniques. The improved techniques for performing vehicle re-identification do not rely on license plate recognition (LPR) or spatial-temporal tracking methods. Instead, the present techniques are able to perform vehicle re-identification based on images that are captured from any single viewpoint. Although all features of the vehicles may not be visible from a single viewpoint, advanced artificial intelligence (AI) and machine learning algorithms are used to generate or infer multi-view representations of the vehicles that permit vehicle re-identification to be performed when the vehicles are captured from other viewpoints, and which allow vehicles having similar appearances (e.g., vehicles with the same color and model) to be distinguished from one another. The following discussion describes exemplary implementations of these techniques.

The technologies discussed herein can be used in a variety of different contexts and environments. One useful application is in the context of intelligent surveillance systems. For example, integrating the present technologies into an intelligent surveillance system enables such system to track, monitor and/or surveil vehicles of interest with enhanced accuracy and without the limitations of conventional re-identification methods described above. Another useful application of these technologies is in the context of intelligent transportation systems. For example, integrating the present technologies into an intelligent transportation system enables such system to track vehicles for enhancing real-time traffic monitoring functions, traffic light sequencing functions (e.g., which dynamically adjust traffic lights in an optimal manner), automated traffic enforcement functions (e.g., which can be used to determine if vehicles are obeying prescribed speed limits), emergency vehicle notification functions (e.g., which notify vehicle occupants of accidents, safety hazards, inclement weather conditions, or other emergencies), and/or other intelligent transportation functions. The technologies discussed herein can also be applied to other types of systems that may benefit from identifying or tracking vehicles.

In accordance with certain embodiments, a camera system comprising a plurality of cameras is in communication with a vehicle re-identification system. The cameras may include any type of optical device that is configured to capture images (e.g., still images and/or video images) in analog and/or digital format. Each camera may be situated in a location where vehicles are expected to be located (e.g., near roadways, parking lots, parking garages, and other locations). The images captured by the cameras are transmitted to the vehicle re-identification system for analysis. The images captured by the cameras may be transmitted to the vehicle re-identification system directly and/or over a network, e.g., a network that includes a local area network, a personal area network, a wide area network, an intranet, and/or the Internet.

Upon receiving the images from the camera system, the vehicle re-identification system is configured to perform functions associated with identifying and tracking vehicles across images captured by multiple cameras. The vehicle re-identification system permits the re-identification and tracking of vehicles in scenarios where the cameras do not have overlapping views. For example, after a vehicle has been captured by a first camera and has exited the FOV of the first camera, the vehicle re-identification system enables the vehicle to be re-identified when the vehicle enters the FOV of other cameras. The vehicle re-identification system is able to perform these functions without the use of LPR and/or spatial-temporal tracking methods, despite the fact that the various cameras may capture the vehicles from different viewpoints and the vehicles' appearances may be similar.

The vehicle re-identification system is comprised of various sub-components to assist the vehicle re-identification system with performing the aforementioned functions. Prior to operating the vehicle re-identification system, a feature and viewpoint extraction component can be trained to analyze images taken by the cameras to extract information that identifies certain vehicle features (e.g., color, model, and type). The feature and viewpoint extraction component is also trained to identify the viewpoint at which vehicles in the images are captured and to classify the images according to the captured viewpoints (e.g., front, rear, side, front-side and rear-side viewpoints). In certain embodiments, the feature and viewpoint extraction component is trained to perform these functions using a deep neural network, such as a convolutional neural network (CNN) that is trained using vehicle attribute labels.

An attention map component utilizes the extracted information to generate attention maps for each image captured by the cameras. Each attention map may identify a specific region of a vehicle in the image that includes an overlapping visual pattern with a viewpoint other than the viewpoint of the captured image. For example, if an image is captured from a front-side viewpoint, the attention maps may identify specific portions of the vehicle which would overlap with other viewpoints (e.g., portions of the vehicle that would be visible from a front viewpoint, side viewpoint, rear viewpoint, and rear-side viewpoint). The attention map information can then be packaged or concatenated together for further processing.

A multi-view inference component can then utilize the attention map information to generate or infer multi-view representations of the vehicles captured in the input images. In certain embodiments, the multi-view inference component utilizes a generative adversarial network (GAN) to create the multi-view representations. The GAN comprises two neural networks—a generative neural network and a discriminative neural network—which compete against each other in a min-max game to generate the multi-view representations. The GAN may be trained prior to operation using real images of vehicles captured at different viewpoints. The multi-view representations can then be compared with vehicle images captured by various cameras included in the camera system to perform vehicle re-identification. In certain embodiments, the vehicle re-identification system utilizes pairwise distance metric learning to assist with accurately identifying the vehicles. A listing of matching vehicles is then compiled and output.

The re-identification techniques described herein can be applied to any type of vehicle including, but not limited to, automobiles, cars, vans, trucks, buses, motorcycles, and/or other types of land-based vehicles. In certain embodiments, the re-identification techniques can also be applied to other types of vehicles such as various types of watercrafts (e.g., boats and ships) and/or aircraft (e.g., planes, helicopters, etc.).

As evidenced by the disclosure herein, the inventive techniques set forth in the disclosure are rooted in computer technologies that overcome existing problems in known re-identification systems, specifically problems dealing with accurately identifying vehicles across images captured by multiple cameras. As mentioned above, many known re-identification systems rely primarily on LPR or spatial-temporal tracking methods and are unable to accurately perform vehicle re-ID without obtaining license plate information and/or spatial-temporal information. The techniques described in this disclosure provide a technical solution (e.g., one that utilizes various AI-based neural networking and machine learning techniques) for overcoming such limitations. For example, the re-identification system described herein takes advantage of novel AI and machine learning techniques to generate or infer global representations of vehicles from a single viewpoint. These global or multi-view representations enable the system to be "viewpoint agnostic" in the sense that it can accurately and effectively re-identify a vehicle from any single viewpoint, even if the previously captured image or images of the vehicle were taken from different viewpoints. This technology-based solution marks an improvement over existing computing capabilities and functionalities related to re-identification systems by improving the accuracy of the re-ID techniques and doing so with less information.

In certain embodiments, a system for re-identifying a vehicle. The system includes a camera system comprising a plurality of cameras, and one of more computing devices comprising one or more processors and one or more non-transitory storage devices for storing instructions. Execution of the instructions by the one or more processors causes the one of more computing devices to: receive an image of a vehicle from a camera included in the camera system; identify, with a trained neural network, a viewpoint of the image; generate attention maps from the image that identify regions of the vehicle which include overlapping visual patterns between the identified viewpoint and one or more additional viewpoints; generate a multi-view representation of the vehicle utilizing the attention maps; and perform vehicle re-identification by comparing the multi-view representation to vehicles identified in previously captured images.

In certain embodiments, a method for re-identifying a vehicle is provided. The method comprises: receiving an image of a vehicle from a camera included in a camera system; identifying a viewpoint of the image utilizing a trained neural network; generating attention maps from the image that identify regions of the vehicle which include overlapping visual patterns between the identified viewpoint and one or more additional viewpoints; generating a multi-view representation of the vehicle utilizing the attention maps; and performing vehicle re-identification by comparing the multi-view representation to vehicles identified in previously captured images.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

FIG. 1 is an exemplary system 100 for identifying and tracking vehicles 110. The exemplary system 100 may be utilized in a variety of different contexts. For example, the system 100 may be integrated into an intelligent surveillance system (e.g., operated by either private or governmental organizations), an intelligent transportation system (e.g., configured to monitor and utilize real-time traffic information), and/or other systems that may benefit from identifying or tracking vehicles.

In this exemplary system 100, a vehicle 110 is shown traveling along a road from Position A to Position B. At Position A, an image of the vehicle 110 is captured by a camera 120 from a side viewpoint 125. Another image of the vehicle 110 is captured at Position B by a separate camera 120 from a front-side viewpoint 125. The images captured by the cameras 120 are transmitted to a re-identification system 150 either directly (e.g., via a direct communication channel between the cameras 120 and the re-identification system 150) and/or over a network 140. The network 140 may represent any type of communication network, e.g., such as one that comprises a local area network (e.g., a Wi-Fi network), a personal area network (e.g., a Bluetooth network), a wide area network, an intranet, the Internet, a cellular network and/or other types of networks.

The re-identification system 150 is configured to perform any and all functions described herein with respect to tracking and identifying vehicles 110 across multiple cameras 120. The re-identification system 150 can include any number of cameras 120 and can be used to track any number of vehicles 110. For example, with reference to FIG. 1, the re-identification system 150 is able to determine whether or not the vehicle 110 captured by the camera 120 at Position B is the same vehicle 110 that was captured by the camera 120 at Position A. As explained in further detail below, the re-identification system 150 utilizes improved artificial intelligence and machine learning functions to re-identify vehicles 110 across multiple cameras 120 and to track the movement of the vehicles 110. The improved re-identification techniques permit the re-identification system 150 to accurately identify and track the vehicles despite the fact that the images captured by the cameras 120 are taken from different viewpoints 125.

Generally speaking, the re-identification system 150 performs these re-identification and tracking functions by generating a multi-view representation of a vehicle captured in an input image by a camera 120, and then comparing the multi-view representation to vehicles in images previously captured by other cameras 120 (e.g., by comparing the multi-view representation of the input image to multi-view representations generated for vehicles in previously captured images). The multi-view representation, which is generated from an image captured from a single viewpoint 125, includes inferred vehicle information that provides a global view of the vehicle 110 from other viewpoints 125. Thus, even if the pre-stored images of the vehicle 110 are taken from varying viewpoints 125, the inferred vehicle information included in the multi-view representation enables the vehicle 110 to be identified and tracked.

As will be evidenced from the discussion provided herein, the re-identification system 150 is able to able to perform vehicle re-identification functions without the use of LPR or spatial-temporal tracking methods. However, it should be understood that certain variations of the system may utilize LPR, spatial-temporal, and/or other tracking methods to supplement the vehicle re-identification functions of the re-identification system 150.

One or more computing devices 130 may also be connected to the system 100 to enable administrators or other individuals to access information associated with the re-identification system 150, cameras 120 and other components of the system 100. For example, the computing devices 130 may present information and interfaces that enable individuals to view information associated with vehicles 110 being tracked (e.g., which enable the individuals to view images and videos of vehicles traveling across different cameras). The computing devices 130 may also enable the individuals to perform functions related to controlling and managing a traffic system, surveillance system or another system, and to utilize the information and data generated by the re-identification system 150 to manage and control such systems.

In certain embodiments, the computing devices 130 may represent desktop computers, laptop computers, mobile devices (e.g., smart phones, personal digital assistants, tablet devices, vehicular computing devices or any other device that is mobile in nature) or other types of computing devices. In certain embodiments, the re-identification system 150 is stored on one or more servers 160. The one or more servers 160 may generally represent any type of computing device, including any of the computing devices 130 mentioned above. In certain embodiments, the one or more servers 160 comprise one or more mainframe computing devices that execute web servers for communicating with the computing devices 130, cameras 120, and other devices over the network 140 (e.g., such as the Internet).

The exemplary cameras 120 shown in figures and described throughout this disclosure may represent any type of optical device or instrument including, but not limited to, video cameras, still image cameras or other devices that include image/video sensors. The images captured by the cameras may include still images, video images and/or other types of image data, and the images may be captured in analog and/or digital format. The cameras 120 can be equipped with analog-to-digital (A/D) converters and/or digital-to-analog converters (D/A) converters based on the configuration of the system.

All the components illustrated in FIG. 1, including the cameras 120, computing devices 130, and servers 160 can be configured to communicate directly with each other and/or over the network 140 via wired or wireless communication links, or a combination of the two. Each of the cameras 120, computing devices 130, and servers 160 can also be equipped with one or more transceiver devices, one or more computer storage devices (e.g., RAM, ROM, PROM, SRAM, etc.) and one or more processing devices (e.g., a central processing unit) that are capable of executing computer program instructions. The computer storage devices are preferably physical, non-transitory mediums.

It should be recognized that the re-identification techniques described herein can be applied to any type of vehicle including, but not limited to, automobiles, cars, vans, trucks, buses, motorcycles, etc. In certain embodiments, the re-identification techniques can also be applied to other types of vehicles, such as various types of watercrafts (e.g., boats and ships) and/or aircraft (e.g., planes, helicopters, etc.). In such embodiments, the cameras 120 can be situated in locations where watercraft and aircraft are expect to be located (e.g., near waterways and airports).

Figure 2:
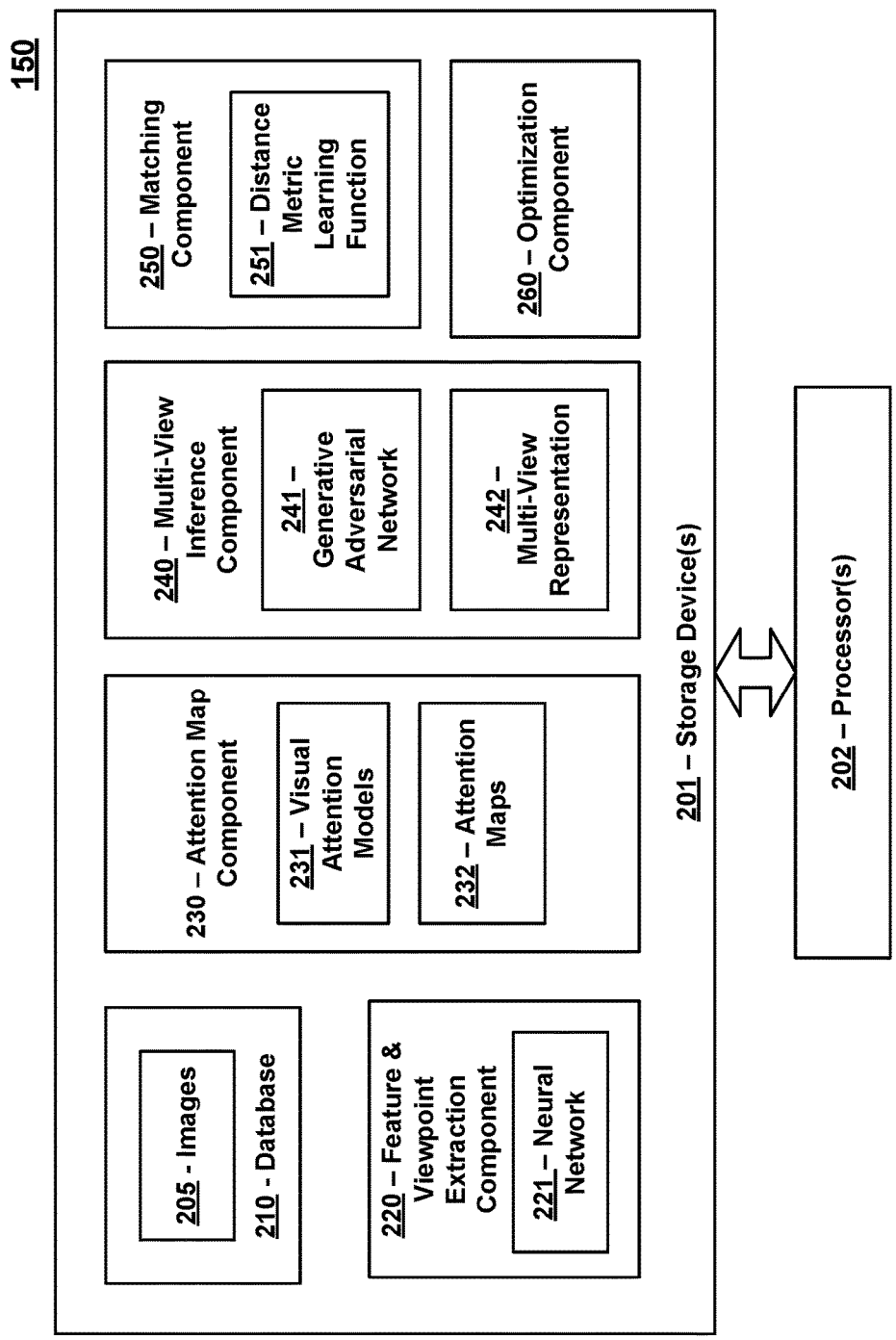
FIG. 2 is a block diagram of an exemplary re-identification system in accordance with certain embodiments.

FIG. 2 is a block diagram of an exemplary re-identification system 150 in accordance with certain embodiments of the present invention. The re-identification system 150 includes one or more storage devices 201 that are in communication with one or more processors 202. The one or more storage devices 201 can include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more central processing units (CPUs), controllers, microprocessors, digital signal processors, and/or computational circuits. The one or more storage devices 201 store data and instructions associated with a database 210, a feature and viewpoint extraction component 220, an attention map component 230, a multi-view inference component 240, a matching component 250, and an optimization component 260. The one or more processors 202 are configured to execute instructions associated with these components. Each of these components is described in further detail below.

The database 210 stores images 205 captured by the cameras 120. For example, as explained above, the cameras 120 may be situated in locations where vehicles 110 are expected to be traveling (e.g., roadways, parking lots, toll booths, etc.) and the cameras 120 may be configured to capture images 205 of the vehicles 110. The images 205 captured by the cameras are transmitted to the re-identification system 150 (e.g., over a network 140) for processing and analysis.

The feature and viewpoint extraction component 220 can be configured to identify vehicle features and viewpoint features in each of the images captured by the cameras 120. For example, in response to capturing an image 205 of a vehicle 110, the feature and viewpoint extraction component 220 can extract information from the image 205 that identifies exemplary vehicle features including, but not limited to, features which identify the color of the vehicle 110, the model and manufacturer of the vehicle 110, the vehicle type (e.g., indicating the body style of the car, such as a sedan, truck, station wagon, van or other style) and/or other related information associated with the vehicle 110. The viewpoint features that are extracted from the images 205 identify the viewpoint 125 of the camera 120 with respect to the vehicle 110. For example, in certain embodiments, the feature and viewpoint extraction component 220 can categorize each vehicle image into one of the following viewpoints: front, rear, side, front-side and rear-side. These five viewpoints enable a comprehensive visual description of the vehicle to be obtained.

The viewpoint features extracted from an image 205 also include information that identifies specific regions of the vehicle (also referred to herein as "central viewpoint feature"). The central viewpoint features may represent the dominant or central regions of a vehicle that would be visible from a specific viewpoint. As explained in further details below, the feature and viewpoint extraction component 220 is trained to obtain viewpoint feature clusters (e.g., using k-means clustering techniques) for each of the viewpoints (e.g., front, rear, side, front-side and rear-side). Each cluster can include a central viewpoint feature that can be used for training the visual attention models referred to below. All of the aforementioned functions performed by the feature and viewpoint extraction component 220 can be learned by executing a training procedure on a deep neural network 221, such as a convolutional neural network (CNN), that is trained using vehicle attribute labels.

The attention map component 230 utilizes the viewpoint feature information to generate a plurality of attention maps 232 for each image 205 captured by the cameras 120. More specifically, the attention map component 230 stores one or more visual attention models 231 that utilize the trained neural network 221 of the feature and viewpoint extraction component 220 to select salient regions of the images 205 and to ignore non-salient regions of the images 205. The attention maps 232 generated for each image 205 identify the salient regions of the image 205. For example, each attention map 232 can identify a specific region of a vehicle 110 in the image 205 that includes an overlapping visual pattern with a viewpoint other than the viewpoint of the captured image 205. Thus, if an image is captured from a side perspective, the visual attention models 231 can be used to generate attention maps 232 that focus on areas of the vehicle 110 that would overlap with other viewpoints (e.g., rear, front, front-side and rear-side). This can be accomplished, at least in part, by using the central viewpoint features mentioned above to train the visual attention model 231. The generation of each attention map 232 may involve masking portions of an input image to exclude image data that is not visible from another viewpoint. The attention maps 232, which focus on portions of the vehicle 110 that overlap with other viewpoints, can be concatenated together to assist with generating or inferring a multi-view representation 242 of the vehicle 110 captured in the input image.

The multi-view inference component 240 utilizes the concatenated attention map information to generate multi-view representations 242 of the vehicles captured in the input images 205. As mentioned above, a multi-view representation 242 may be generated from an image captured from a single viewpoint 125, and includes inferred vehicle information that provides a global view of the vehicle 110 from all viewpoints 125. In certain embodiments, the multi-view representations 242 of the vehicles 110 are generated or inferred using a generative adversarial network (GAN) 241. The GAN 241 may comprise two neural networks competing against each other in a min-max game or zero-sum game. More specifically, the GAN 241 comprises a generative neural network that is configured to generate candidate samples to be used in creating the multi-view representations 242, and a discriminative neural network that is configured in a manner that attempts to distinguish real data samples from the candidate samples. The generative neural network and the discriminative neural network compete against one another in a manner that enables the generative neural network to produce candidate samples that the discriminative neural network cannot distinguish from real samples. The candidate samples deemed acceptable by the discriminative neural network are then utilized to create the multi-view representations of the vehicles 110. As described in further detail below, the GAN 241 may be trained using a second generative neural network that utilizes real images of vehicles features. However, the second generative neural network may only be used during a training phase in which the re-identification system 150 is being calibrated and is not needed during testing or operational phases.

The matching component 250 is configured to determine whether a vehicle 110 captured in an image 205 by a camera 120 matches, or is the same as, one or more vehicles 110 previously captured in images by the cameras 120. To accomplish this task, the matching component 250 can compare the multi-view representation 242 of a vehicle captured in an image 205 to other multi-view representations 242 generated from other images 205. In certain embodiments, the matching component 250 can utilize a distance metric learning function 251 to determine how similar or related the vehicle 110 in the image 205 is to other vehicles 110 captured in other images 205. For example, the distance metric learning function 251 can utilize a pairwise distance metric learning function to accurately determine how similar or related the vehicles 110 in different images 205 are to one another. Regardless of whether an image pair is captured from different viewpoints, the multi-view representations 242 permit the vehicles in the images to be accurately identified because the multi-view representations 242 are viewpoint agnostic. The distance metric learning function 251 may generate distance scores that indicate how similar the vehicles 110 in a pair of images 205 are to one another, and the scores can be used to determine whether the vehicles match. Any matching image pairs indicate that a vehicle has been re-identified, and the matching image pairs can be placed in a list and presented for output (e.g., for output on computing device 130).

The optimization component 260 can perform any and all functions associated with training and/or optimizing the various components of the re-identification system 150. In certain embodiments, the optimization component 260 can be used to train the neural network 221 utilized by the feature and viewpoint extraction component 220. For example, in certain embodiments, the neural network 221 represents a CNN and the optimization component 260 utilizes softmax classifiers corresponding to vehicle attribute labels to train the CNN. The optimization component 260 can then utilize the information learned by the neural network 221 (e.g., including the central viewpoint features extracted from the clusters) to train the visual attention models 231 utilized by the attention map component 230 to generate the attention maps 232. The optimization component 260 can then be used to optimize and train the GAN 241, which is utilized by the multi-view inference component 240 to generate the multi-view representations. As mentioned above, the GAN 241 includes a generative neural network and a discriminative neural network. The optimization component 260 can pre-train the generative neural network and the discriminative neural network with real image data as described in further detail below. Finally, the optimization component 260 can then be utilized to train the distance metric learning function 251 of the matching component 250 to learn distance metrics and to determine whether vehicles in an image pair are matches. The details of these optimization and/or training functions are discussed in further detail below.

Exemplary embodiments of the re-identification system 150 and the aforementioned sub-components (e.g., the database 210, feature and viewpoint extraction component 220, attention map component 230, multi-view inference component 240, matching component 250, and optimization component 260) are described in further detail below. While the sub-components of the identification system 150 may be depicted in FIG. 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the re-identification system 150 may be illustrated as being implemented in software in certain portions of this disclosure, it should be recognized that the sub-components described herein may be implemented in hardware and/or software.

Figure 3:
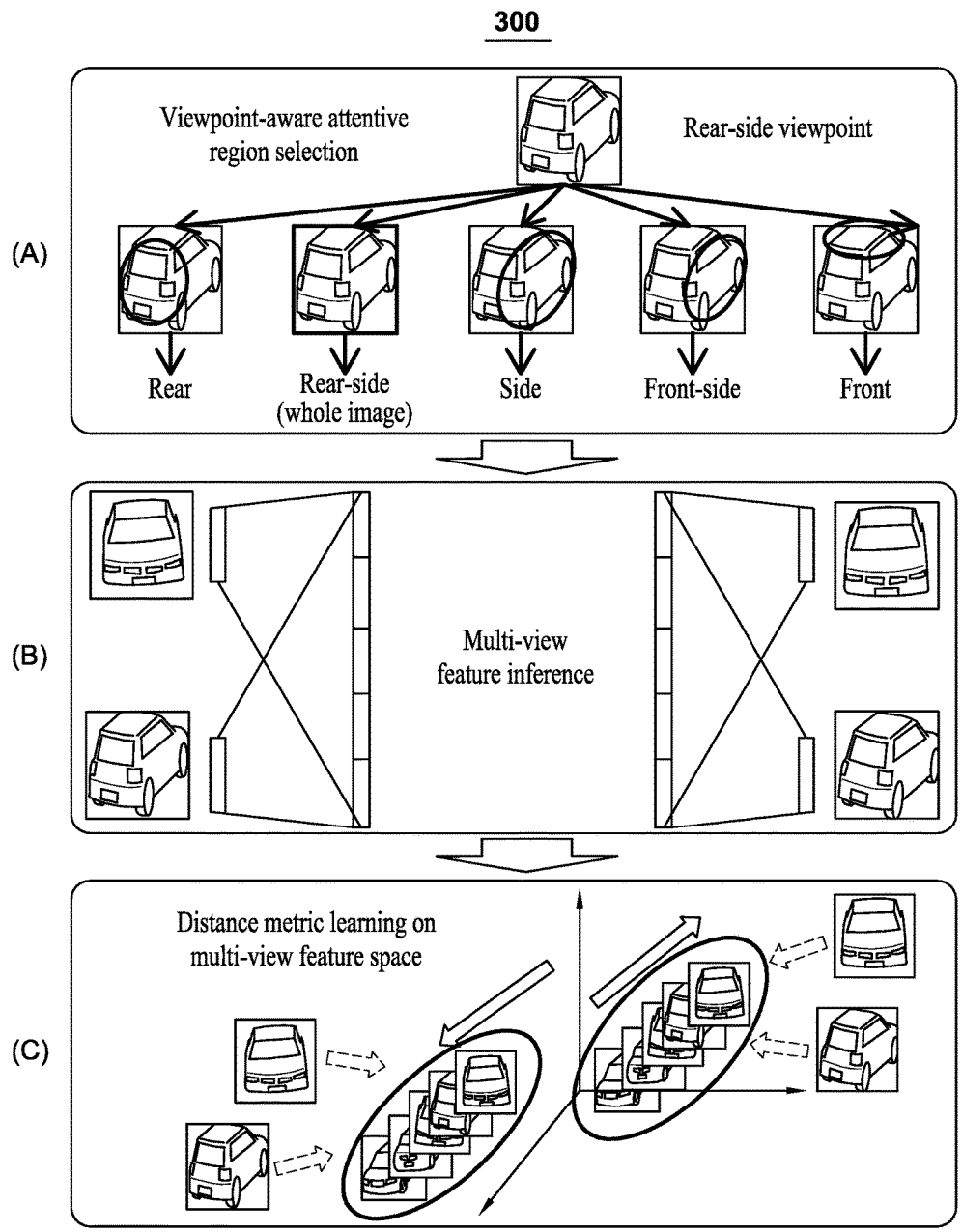
FIG. 3 is flow chart that provides an overview of an exemplary re-identification procedure in accordance with certain embodiments.

FIG. 3 is flow chart that provides an overview of an exemplary re-identification procedure 300 in accordance with certain embodiments. More specifically, this figure depicts three exemplary stages of a vehicle re-identification procedure 300. These stages provide a high-level overview of how the re-identification system 150 can be used to track and/or re-identify vehicles 110 in accordance with certain embodiments.

At Stage A, an image 205 captured by a camera 120 is provided to the re-identification system 150 for analysis. In this example, the image 205 of the vehicle is captured from a rear-side viewpoint 125. After the feature and viewpoint extraction component 220 utilizes a pre-trained neural network 221 to identity the viewpoint 125 of the image 205 and to extract other feature information, the attention map component 230 identifies specific regions of the image 205. The regions of the image 205 correspond to features or portions of the vehicle 110 that overlap with other viewpoints 125 (e.g., which would be visible from viewpoints 125 other than the rear-side viewpoint 125 from which the image 205 was captured). The identification of the specific regions of the image can be performed using the visual attention model 231, which generates a plurality of attention maps 232 that identify the regions. For example, because the image 205 was captured form the rear-side viewpoint, attention maps 232 may be created to identify features or portions of the vehicle 110 that would be visible from the rear viewpoint, side viewpoint, front-side viewpoint, and front viewpoint. An attention map 232 does not need to be created from the rear-side viewpoint since the image 205 was captured from this viewpoint 125. The entirety of the image 205 (or the entirety of the vehicle 110 shown in the image 205) can be used for the rear-side viewpoint. This information is then concatenated together with the attention maps 232 and passed to the next stage.

At Stage B, the concatenated attention map information is utilized by the multi-view inference component 240 to create or infer a multi-view representation 242 of the vehicle 110 captured in the image 205. More specifically, in accordance with certain embodiments, the multi-view representation 242 can be generated by a GAN 241 using the concatenated attention map information. The appearance of the vehicle that is not visible from certain viewpoints (e.g., the rear viewpoint, side viewpoint, front-side viewpoint and front viewpoint) is inferred by the GAN 241. To accomplish this, the GAN 241 can combine an adversarial training mechanism and auxiliary vehicle attribute classifiers to achieve effective feature generation. The features generated by the GAN 241 can then be incorporated into the multi-view representation 242 to provide a global view of the vehicle 110 from all viewpoints 125.

At Stage C, the matching component 250 utilizes the multi-view representation 242 generated for the vehicle 110 in the captured image 205 as a basis of comparison against vehicles identified in other images 205 that were captured by various cameras 120 and which may be stored in a database 210 associated with the re-identification system 150. The matching component 250 can compare the multi-view representation 242 generated for the vehicle 110 against other multi-view representations 242 generated for other images. Because the multi-view representations 242 provide a global view of the vehicles 110, the matching component 250 can accurately identify the vehicle 110 in the captured image 205 across a plurality of previously stored images 205 even if the images 205 were captured from viewpoints 125 that are different than that of the captured image (e.g., which were not taken from the rear-side viewpoint 125). The matching functions performed by the matching component 250 can be performed by the distance metric learning function 251, which can compute a distance metric for each of a plurality of image pairs (e.g., where each image pair can include the captured image and another previously captured image stored in the database 210). The distance metric for an image pair may represent a score or indicator that can be used to determine how similar or related the vehicles 110 in the image pair are to one another. Vehicles 110 that are identified as being the same can then be re-identified and tracked across images 205 taken by the various cameras 110. This tracking may be performed in connection with a surveillance system, transportation system or another type of system.

Figure 4:
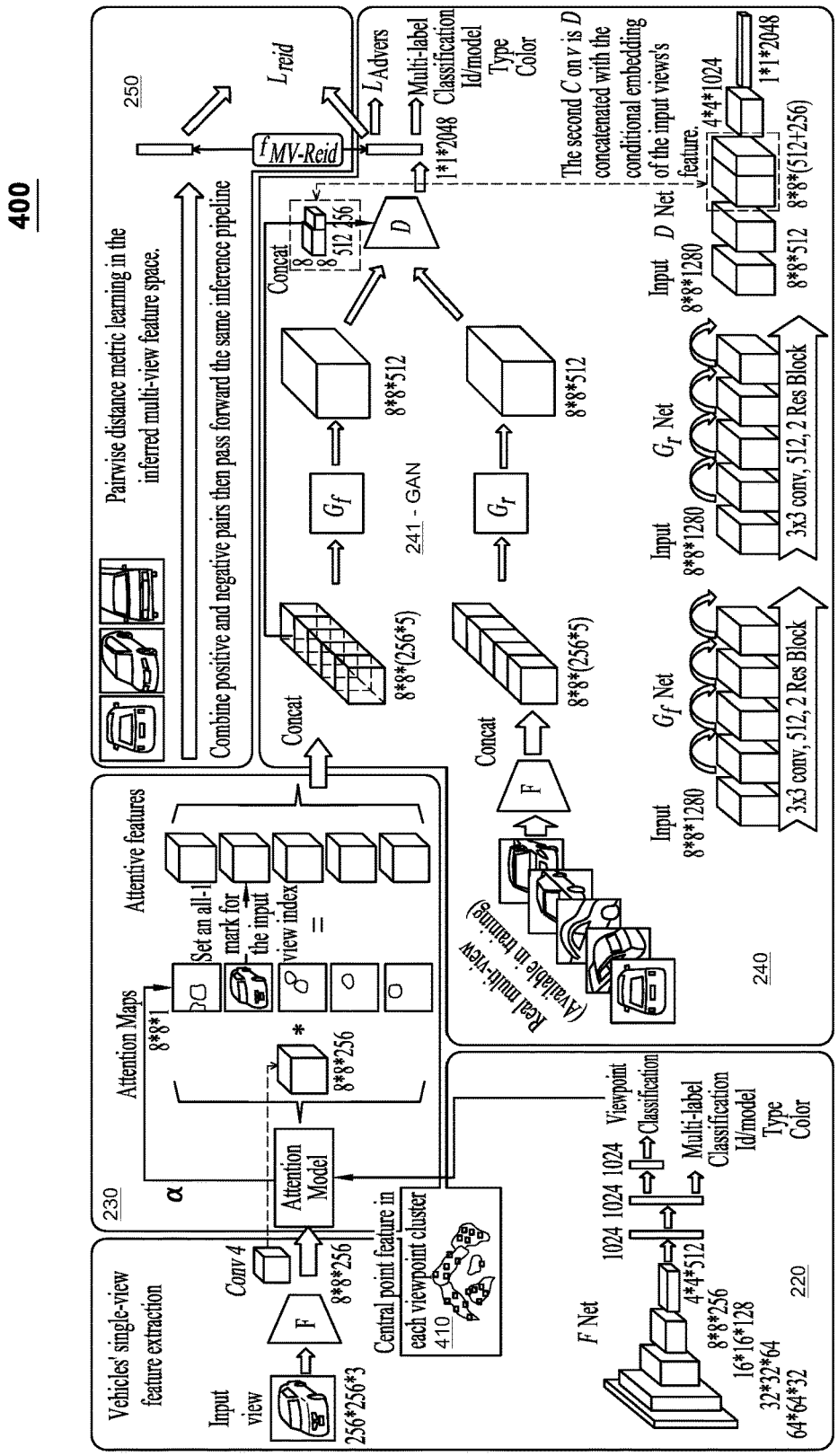
FIG. 4 is a diagram illustrating an exemplary architecture for a re-identification system in accordance with certain embodiments.

FIG. 4 is a diagram illustrating an exemplary architecture 400 for a re-identification system 150 in accordance with certain embodiments. The exemplary architecture 400 is divided into four different components corresponding to underlying architectures for the feature and viewpoint extraction component 220, the attention map component 230, the multi-view inference component 240, and the matching component 250. Before getting into the specifics of each of these sub-components, a formulation of the problem which the re-identification system 150 may be configured to solve is provided.

In certain embodiments, the target of re-identification system 150 is to generate a ranked listing of candidate images (e.g., which correspond to previously captured images that are stored in database 210) from a query vehicle image, such that images matching the query vehicle's identity are placed in top positions of the list, while images that do not match the query vehicle's identity are placed at the bottom of the list (or lower in the list). For example, the re-identification system 150 can define a pair of images $(I_i,I_j)$ and their corresponding similarity label $l_j$. $I_j$ and $l_j$ are two views of the same vehicle, then $l_{ij}=1$. Otherwise, $l_{ij}=0$ if they are views of different vehicles. For each single-view input image I (also referred to as the query image), the re-identification system 150 (e.g., using the multi-view inference component 240) aims to map its feature to a multi-view representation f using the following function:

$$f = T(\text{concat}(\{x_v\}_{v=1}^V)) = T(\text{concat}(F(I) \cdot \{a_v\}_{v=1}^V))$$

where:
I represents the input image;
f represents the multi-view representation of the vehicle being generated from input image I;
$\{x_v\}_{v=1}^V$ represents the concatenated attention features from the input image I;
T(·) represents the function that transforms the concatenated attention features into the multi-view representation f;
F(·) represents the function that extracts features of the input image;
V represents the number of viewpoints;
$\{a_v\}_{v=1}^V$ represents attention maps from viewpoint 1 to V;
v represents a target viewpoint for which features are being inferred;
α represent the attention maps generated for the input image I; and
x represents an attended feature of one of the V viewpoints.

The operator F(·) extracts the features of the input image I. $\{a_v\}_{v=1}^V$ is obtained by the viewpoint-aware attention model (e.g., visual attention model 231) to select overlapped regions between the input view and a target viewpoint v, where V is the defined number of viewpoints. Moreover, the operator T(·) denotes the transformation from the concatenated attentive single-view features $\{x_v\}_{v=1}^V$ to the inferred multi-view features. After modeling f, the re-identification system 150 (e.g., via the distance metric learning function 251 and/or optimization component 260) aims to optimize the system by minimizing a loss function $\mathcal{L}_{reid}$ to shorten the distance between $f_i$ and $f_j$ when $l_{ij}=1$ and maximize the distance when $l_{ij}=0$ by adopting the pairwise contrastive loss.

Learning $F(\cdot)$ for extracting vehicles' single-view features may be accomplished by training a deep CNN (e.g., the neural network 221 of the feature and viewpoint extraction component 220) using vehicles' attribute labels. To obtain viewpoint-aware attention maps α (e.g., the attention maps 232 generated by the attention map component 230) for extracting core regions of an image which are targeted at different viewpoints from the input viewpoint, corresponding viewpoint embeddings are incorporated into an intermediate layer of the F Net. Exploiting the attention maps for different viewpoints as conditions, $T(\cdot)$ enables the generation of multi-view features (e.g., for inclusion in a multi-view representation 242 which provides a global view of the vehicle) using an adversarial training architecture. During training, features extracted from real images in various viewpoints of the input vehicle are used, but this branch of the adversarial training architecture is no longer needed in the testing or operational phases of the re-identification system. A discriminative network distinguishes the generated multi-view features from the real world features (e.g., included in real images) and adopts auxiliary vehicle classifiers to help match the inferred features with the correct input vehicle's identity. Given pairwise image inputs, a contrastive loss is configured at the end to optimize the network embedded with distance metric learning.

Exemplary architectures of the feature and viewpoint extraction component 220, the attention map component 230, the multi-view inference component 240, and the matching component 250 are described below.

The feature and viewpoint extraction component 220 is located on the left side of the figure. As mentioned above, the feature and viewpoint extraction component 220 includes a trained neural network 221 for extracting features from images 205 captured by the cameras 120. The exemplary neural network 221 is labeled in this figure as F Net (which corresponds to $F(\cdot)$ function mentioned above). The F Net may be built with a deep CNN module for learning vehicles' intrinsic features (e.g., such as the vehicles' model, color, and type). Its backbone may deploy five convolutional (conv) layers and two fully-connected ($f_c$) layers. The first two conv layers can be configured with 5×5 kernels, while the following three conv layers can be set with 3×3 kernels. Stride can be set with 4 for the first conv layer and 2 for the remaining conv layers. A Leaky-ReLU can be set after each layer with the leak of 0.2. Detailed hyper-parameter settings are illustrated in the bottom-left part of FIG. 4.

In addition to two 1024-dimensional $f_c$ layers connected with multi-attributes classification, one more 256-dimensional $f_c$ layer maybe configured for viewpoint classification. Specifically, all of the vehicle images can be coarsely categorized into one of the following five viewpoints (V=5): front, rear, side, front-side, and rear-side. These five viewpoints are sufficient to describe a vehicle comprehensively. After the F Net is trained, it can extract viewpoint features over all the training data and easily learn five viewpoints' feature clusters by k-means clustering. The feature in the center of each cluster (e.g., the central viewpoint feature 410) can be obtained. These central viewpoint features 410 can be used for learning the viewpoint-aware attention model (e.g., visual attention model 231).

Figure 5:
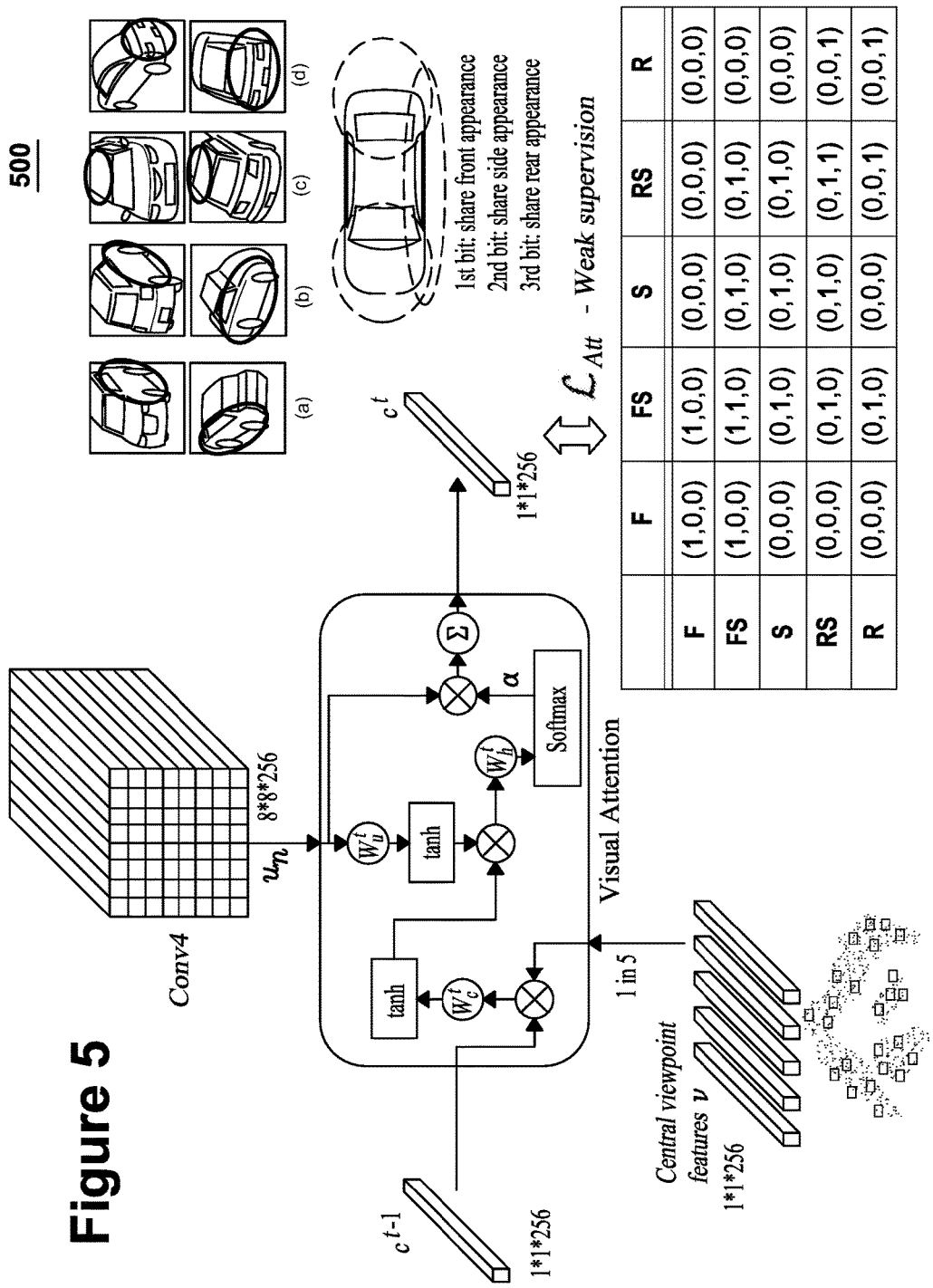
FIG. 5 is a diagram showing an exemplary architecture for a visual attention model in accordance with certain embodiments.

One or more visual attention models 231 can be used by the attention map component 230 to automatically select salient regions and drop useless information from the input image. In certain embodiments, the visual attention model 231 used by the attention map component 230 focuses on the overlapped visual pattern of vehicles between the input viewpoint and each of the target viewpoints (e.g., which correspond to the other four viewpoints). For instance, to identify the difference between two similar vehicles from the front-side and rear-side viewpoints, humans usually will pay attention to their shared side appearance to discriminate whether the two vehicles are the same or not. The visual attention model 231 can focus on these shared or overlapping portions between the input viewpoint and each of the target viewpoints in creating the attention maps 232. FIG. 5 demonstrates how this may be accomplished using a "viewpoint-aware" attention model 231.

FIG. 5 is an illustration showing an exemplary architecture 500 for a visual attention model 231 in accordance with certain embodiments. The top-right portion of FIG. 5 includes four examples of shared or overlapping image regions of vehicles captured from arbitrary views. The top and bottom view of each image pair identifies the overlapping regions that can be used for a target view that is being inferred.

For instance, with respect to example (a), a pair of images shows a vehicle from a front-side viewpoint (top image) and a rear-side viewpoint (bottom image). The highlighted portions (circled) of the images identify an overlapping region that would be visible from a side view of the vehicle. Thus, upon receiving an input image of the vehicle from the front-side viewpoint (top image), the visual attention model 231 may generate an attention map 232 that focuses on the circled region of a side view point. The visual attention model 231 may then do the same for the other viewpoints. Examples (b)-(d) similarly show overlapping image regions of differing views.

In order to extract feature vectors of different regions, the visual attention model 231 selects the Conv4 layer of the F Net because it has high-level perceptrons and keeps a large enough spatial size. The input image can be represented as $\{u_1, u_2, \ldots, u_N\}$, where N is the number of image regions and $u_n$ is a 256-dimensional feature vector of the n-th region. The visual attention model 231 executes the viewpoint-aware attention mechanism in multiple steps. The attention mechanism at each step can be considered a building block. Each attention map 232 can be produced by learning a context vector weakly supervised by labels indicating a shared appearance between the input viewpoint and each of the target viewpoints.

For example, the context vector at step t can attend to certain regions of the input view by the following equation:

$$c^t = \text{Attention}(c^{t-1}, \{u_n\}_{n=1}^N, v)$$

where:
$c^t$ is the context vector at step t;
$c^{t-1}$ is the context vector at step t−1;
v represents one of the five central viewpoint features;
$u_n$ represents an image vector at index n; and
N is the number of image regions.

A soft attention mechanism may be adopted so that a weighted average of all the input feature vectors is used for computing the context vector. The attention weights $\{a_n^t\}_{n=1}^N$ may be calculated through two layer non-linear transformations and a softmax function as follows:

$$h_n^t = \tanh(W_c^t(c^{t-1} \odot v) + b_c^t) \odot \tanh(W_u^t u_n + b_u^t),$$

$$a_n^t = \text{softmax}(W_h^t h_n^t + b_h^t),$$

-continued $$c^t = \sum_{n=1}^{N} \alpha_n^t u_n,$$

where:

$h_n^t$ represents the hidden layer feature vector of the image region n at step t;

$\alpha_n^t$ represents the attention weight assigned image region n at step t;

$c^t$ represents the context vector computed at step t;

$c^{t-1}$ represents the context vector computed at step t−1;

$u_n$ represents an image vector at index n;

tan h( ) is a hyperbolic tangent function or activation function that is used to map any real number ([−Inf, Inf]) to a number between ([−1, 1]).

softmax( ) is a function that is used to squash the outputs to be between 0 and 1, and to divide each output such that the total sum of the outputs is equal to 1;

$W_c^t$ represents the learnable weight for the attended context vector at step t−1;

$W_u^t$ represents the learnable weight for the image vector at step t;

$W_h^t$ represents the learnable weight for the hidden layer vector at step t;

v represents one of the five central viewpoint features;

$b_u^t$ represents the learnable bias for the image vector at step t;

$b_c^t$, represents the learnable bias for the attended context vector at step t−1;

$b_h^t$ represents the learnable bias for the hidden layer vector at step t; and ⊙ denotes element-wise multiplication.

With respect to the above equations, $W_c^t$, $W_u^t$, $W_h^t$ and bias terms are learnable parameters. $h_n^t$ is the hidden state and ⊙ denotes the element-wise multiplication. The context vector $c^0$ is initialized by:

$$c^0 = \frac{1}{N}\sum_{n=1}^{N} u_n,$$

where:

$c^0$ represents the context vector computed at step 0;

N is the number of image regions; and $u_n$ represents an image vector at index n.

Learning this viewpoint-aware attention model can be performed using a procedure that is mainly weakly supervised by the shared appearance region's labels between the input and target viewpoints. Three-bit binary codes can be used to encode the view-overlap information as shown in the bottom-right matrix of FIG. 3. The first bit of the three-bit codes is set as 1 when the two viewpoints share the front appearance. The second bit of the three-bit codes is set as 1 when the two viewpoints share the side appearance. The third bit of the three-bit codes is set as 1 when the two viewpoints share the rear appearance. Otherwise, if the two viewpoints do not share the front, side, or rear appearances, the corresponding bits are set to 0.

The attention loss $\mathcal{L}_{Att}$ is optimized by the cross entropy. For example, if the input vehicle image is the front-side viewpoint and the target viewpoint is rear-side viewpoint, the central viewpoint feature of rear-side will be adopted as the v and the supervision codes will be (0, 1, 0) because the two viewpoints only share the side appearance region. Once the visual attention model 231 is trained, it can output an attention map 232 which only gives high response on the side appearance of the vehicle in the input image. Moreover, for certain cases where none of the front, side or rear appearance is overlapped between viewpoint pairs (i.e., (0, 0, 0)), it is observed that the top appearance can be used, which is discussed in further detail below.

In certain embodiments, the goal of the visual attention model 231 is to infer multi-view features corresponding to all five viewpoints from the input viewpoint of the input image (as illustrated by the attention map component 230 in FIG. 4). To accomplish this, the visual attention model 231 can be configured to extract the input view's Conv4 feature maps and output corresponding attention maps $\{a_v\}_{v=1}^{V}$ for the other four viewpoints (i.e., the viewpoints other than the input viewpoint). The feature maps of the input view may be masked by the attention maps 232 to remove non-salient features. Then, these intermediate attentive feature maps $\{x_v\}_{v=1}^{V}$ are concatenated as conditional embeddings to provide assistance with inferring multi-view features.

Referring back to FIG. 4, the multi-view inference component 240 receives the concatenated attention information from the attention map component 230 and utilizes this information to create a multi-view representation 242 of the vehicle identified in the input image using a generative adversarial network 241. The generative adversarial network 241 may include a generative neural network and a discriminative neural network that compete against one another. The generative neural network ($G_f$ Net and $G_r$ Net) is illustrated on the left side of the multi-view inference component 240, and the discriminative neural network (D Net) is illustrated on the right side of the multi-view inference component 240. The generative neural network may be configured to take a latent random vector z from a uniform or Gaussian distribution as input to generate samples, while the discriminative net aims to distinguish the real data x from generated samples. The $p_z(z)$ is expected to converge to a target real data distribution $p_{data}(x)$. In certain preferred embodiments, the generative adversarial network 241 includes a conditional feature-level generative network that is configured to infer real multi-view features from the attentive features and/or attention maps 232 extracted from input images that capture a vehicle from a single viewpoint.

Instead of generating real images, the generative adversarial network 241 can be configured to transform single-view features into multi-view features using a generative model. Two networks for both the fake path and the real path are designed as $G_f$ and $G_r$, respectively. The input of $G_f$ is the concatenated attentive feature $\{x_v\}_{v=1}^{V}$ of the input single-view image in which the noise is embedded in the form of dropout. The input of $G_r$ is the real features $\{\bar{x}_v\}_{v=1}^{V}$ of images from different viewpoints of the same vehicle identity with $G_f$. The $G_r$ is used for fusing and learning a real high-level multi-view feature of the input vehicle.

Because the GAN 241 is not required to generate images by gradually enlarging the spatial size of feature maps (and instead is used to infer high-level multi-view features), $G_f$ and $G_r$ can use residual transformation modules rather than adopting deconvolutional layers. The residual transformation modules may include four residual blocks whose hyperparameters are shown in FIG. 4. One advantage of using residual blocks is that the networks can better learn the transformation functions and fuse features of different viewpoints by a deeper perceptron. Moreover, $G_f$ and $G_r$ have the same architecture, but do not share the parameters since they are used for different purposes.

The discriminative neural network (D or D Net) utilizes a general fully convolutional network to distinguish the real multi-view features from the generated ones. Rather than maximizing the output of the discriminator for generated data, the objective of feature matching is employed to optimize $G_f$ to match the statistics of features in an intermediate layer of D. The adversarial loss is defined in the following equation:

$$\mathcal{L}_{Advers} = \max_D (\mathbb{E}(\log(D(G_r(\{\bar{x}_v\}_{v=1}^V)))) + \mathbb{E}(\log(1 - D(G_f(\{x_v\}_{v=1}^V))))) + \min_{G_f} \|\mathbb{E}(D_m(G_r(\{\bar{x}_v\}_{v=1}^V))) - \mathbb{E}(D_m(D_m(G_f(\{x_v\}_{v=1}^V))))\|_2^2$$

where:
$\mathcal{L}_{Advers}$ represents the adversarial loss;
m represents the $m^{th}$ layer in discriminative neural network;
D represents the discriminator;
$G_f$ represents the generator for the fake path;
$G_r$ represents the generator for the real path;
$\{\bar{x}_v\}_{v=1}^V$ represents the real features of images from V viewpoints for a vehicle;
$\{x_v\}_{v=1}^V$ represents the generated features of V viewpoints for a vehicle from a single-view input;
$\mathbb{E}(\ )$ represents the math expectation;
log( ) represents the Logarithmic function;
max( ) represents the maximum function; and
min( ) represents the minimum function.

As indicated in the above equation, m refers to the $m^{th}$ layer in D and, thus, can be set to D(m=4). Moreover, D is trained with auxiliary vehicles' multi-attributes classification to better match inferred multi-view features with input vehicles' identities. An exemplary architecture of D is shown on the right side of FIG. 4. In this embodiment, the second conv layer is concatenated with the input single-view feature maps to better optimize the conditioned $G_f$ and D. Then, two more conv layers are applied to output the final multi-view feature $f_{MV\_Reid}$, which is a 2048-dimensional feature vector. The final conv layer deploys the 4×4 kernels, while the other layers use 3×3 kernels. For all the conv layers in $G_f$, $G_r$, and D, a Leaky-ReLU activation and batch normalization is applied. Pre-activation can be implemented for residual blocks.

In the training phase, in addition to optimizing the $\mathcal{L}_{Advers}$, the $\mathcal{L}_{Reid}$ loss function mentioned above can be configured to implement model learning with distance metrics given positive and negative vehicle image pairs. This is illustrated in the matching component 250, which is located in the upper right portion of FIG. 4. Learning $\mathcal{L}_{Reid}$ is L based on the $f_{MV\_Reid}$ inferred from the single-view input rather than corresponding real multi-view inputs. Conducting distance metric learning in this manner is advantageous because the generated multi-view feature space is viewpoint-invariant. In the testing or operational phase, only single-view inputs are available. Given any image pair having arbitrary viewpoints, each image can pass forward the F, $G_f$ and D to infer the $f_{MV\_Reid}$, including all global viewpoint information of the input vehicle. Then, the Euclidean distance between the pair can be computed for the final ranking of the candidate images (e.g., the previously captured images that are being compared to the input image).

As mentioned above, the optimization component 260 illustrated in FIG. 2 can be configured to optimize and train various components of the re-identification system 150. The training and optimization functions can include four separate steps. In the first step, the F Net for vehicle feature learning can be trained using softmax classifiers. Then, the computed five central viewpoint features can be used for training the viewpoint-aware attention model using $\mathcal{L}_{Att}$. In the second step, the $G_r$ for learning the real multi-view features from five viewpoint inputs can be pre-trained by auxiliary vehicles' multi-attributes classification together with D. Otherwise, optimizing the $G_f$, $G_r$ and D together at the early stage will render the $\mathcal{L}_{Advers}$ unstable because the fused real data distribution in the adversarial architecture has not been shaped. Once the $G_r$ is trained, it is fixed. In the following step, the conditioned $G_f$ and D nets can be optimized by $\mathcal{L}_{Advers}$ to infer multi-view features from single-view inputs. Finally, the pairwise loss $\mathcal{L}_{Reid}$ can be added to fine-tune the whole system (except for F and $G_r$) to learn distance metrics, since at the early training stage the inferred multi-view features are poor so that the $\mathcal{L}_{Reid}$ cannot contribute to the optimization.

Extensive ablation studies and comparative experiments conducted on the public datasets, i.e., the VeRi and VehicleID datasets, have demonstrated the effectiveness and superiority of the vehicle re-identification system 150 over state-of-the-art vehicle re-identification approaches.

Figure 6:
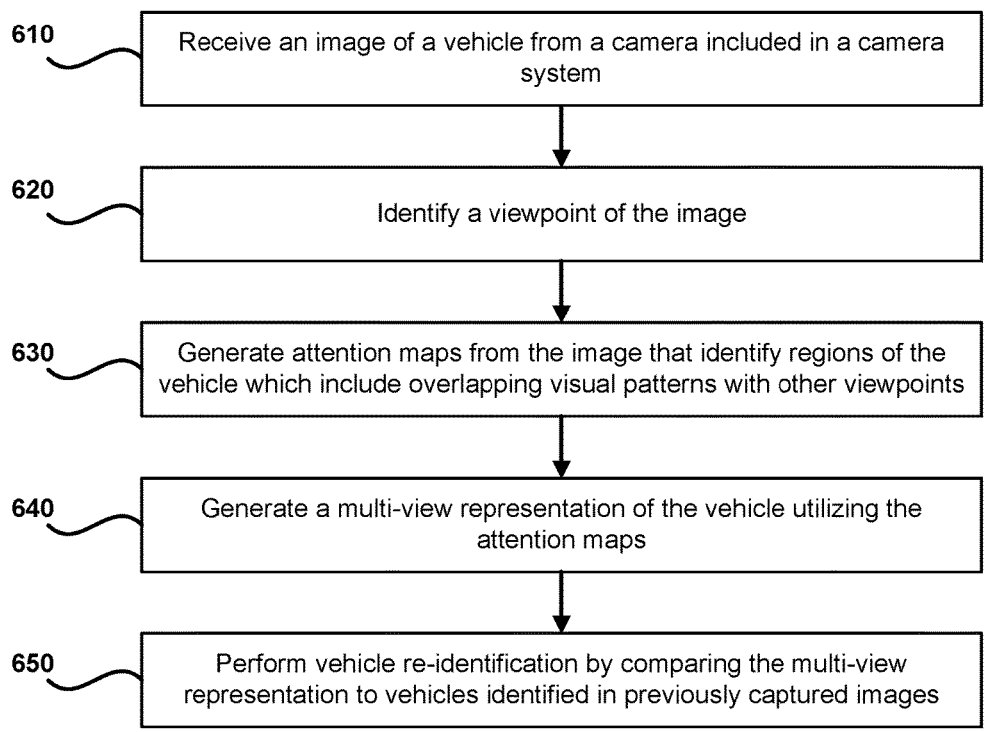
FIG. 6 is a flow chart of an exemplary method for re-identifying a vehicle in accordance with certain embodiments of the present invention.

FIG. 6 is a flow chart of an exemplary method 600 for re-identifying a vehicle 110 in accordance with certain embodiments of the present invention. The exemplary method 600 may be executed in whole or in part by the re-identification system 150. For example, one or more storage devices 201 can store instructions for performing the steps of method 600, and one or more processors 202 can be configured to execute performance of the steps of method 600.

At step 610, an image 205 of a vehicle 110 is received from a camera 120 included in a camera system. The camera 120 may be associated with a camera system that is used in connection with providing surveillance, intelligent transportation and/or other functions. The vehicle 110 may represent a land-based vehicle (e.g., automobile, car, truck, etc.), a water-based vehicle (e.g., boats, ships, and other types of watercraft) and/or an air-based vehicle (e.g., planes, helicopters and other types of aircraft). The image 205 may be received by the re-identification system 150 either directly or over a network 140.

At step 620, a viewpoint 125 of the image 205 is identified. In certain embodiments, the viewpoint 125 of the image may be identified using a neural network 221 (e.g., a convolutional neural network) that is trained using vehicle attribute labels. The viewpoint 125 of the image 205 can be categorized as a front viewpoint, rear viewpoint, side viewpoint, front-side viewpoint, or rear-side viewpoint.

At step 630, attention maps 232 are generated from the image 205 that identify regions of the vehicle that include overlapping visual patterns with other viewpoints 125. In certain embodiments, the vehicle can be categorized into one of five viewpoints, and attention maps 232 are created for the other four viewpoints. Each attention map 232 focuses on a portion of the vehicle which is shared with another viewpoint 125.

At step 640, a multi-view representation 242 of the vehicle 110 is generated utilizing the attention maps 232. The multi-view representation 242 provides a global view of the vehicle 110 across multiple viewpoints 125 and includes inferred vehicle feature information for viewpoints other than the identified viewpoint. As explained above, the multi-view representation 242 of the vehicle 110 may be generated by a generative adversarial network 241 that generates the inferred information using a pair of competing neural networks.

At step 650, vehicle re-identification is performed by comparing the multi-view representation 242 to vehicles 110 identified in previously captured images 205. In certain embodiments, this comparison may be performed utilizing a pairwise distance metric learning function to compute distance metrics indicating a similarity between the vehicle in the image and the vehicles identified in the previously captured images.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for re-identifying a vehicle comprising:
a camera system comprising a plurality of cameras;
one or more computing devices comprising one or more processors and one or more non-transitory storage devices for storing instructions, wherein execution of the instructions by the one or more processors causes the one or more computing device to:
receive an image of a vehicle from a camera included in the camera system;
identify, with a trained neural network, a viewpoint of the image;
generate attention maps from the image that identify regions of the vehicle which include overlapping visual patterns between the identified viewpoint and one or more additional viewpoints;
generate a multi-view representation of the vehicle utilizing the attention maps; and
perform vehicle re-identification by comparing the multi-view representation to vehicles identified in previously captured images.

2. The system of claim 1, wherein the multi-view representation includes inferred vehicle information associated with the one or more additional viewpoints that provides a global view of the vehicle.

3. The system of claim 2, wherein a conditional generative adversarial network is utilized to infer the vehicle information that is used to generate the multi-view representation of the vehicle.

4. The system of claim 3, wherein the conditional generative adversarial network comprises a generative neural network and a discriminative neural network that compete against one another to generate the multi-view representation of the vehicle.

5. The system of claim 4, wherein the conditional generative adversarial network is trained using a second generative neural network that utilizes real image data of vehicles.

6. The system of claim 1, wherein comparing the multi-view representation to vehicles identified in previously captured images includes utilizing a pairwise distance metric learning function to compute distance metrics indicating a similarity between the vehicle in the image and the vehicles identified in the previously captured images.

7. The system of claim 1, wherein the attention maps are generated, at least in part, using an attention model that enables identification of context vectors indicating the overlapping visual patterns of the vehicle between the identified viewpoint and the one or more additional viewpoints.

8. The system of claim 1, wherein execution of the instructions by the one or more processors causes the computing device to:
use a trained neural network to extract vehicle features from the image, including features that identify a color of the vehicle, a model of the vehicle, and a type of the vehicle.

9. The system of claim 8, wherein:
the trained neural network comprises a convolutional neural network that is trained using vehicle attribute labels; and
the convolutional neural network is utilized to train an attention model that is used to generate the attention maps.

10. The system of claim 1, wherein the system for re-identifying the vehicle is utilized in connection with a surveillance system or a transportation system.

11. A method for re-identifying a vehicle comprising:
receiving an image of a vehicle from a camera included in a camera system;
identifying, with a trained neural network, a viewpoint of the image;
generating attention maps from the image that identify regions of the vehicle which include overlapping visual patterns between the identified viewpoint and one or more additional viewpoints;
generating a multi-view representation of the vehicle utilizing the attention maps; and
performing vehicle re-identification by comparing the multi-view representation to vehicles identified in previously captured images.

12. The method of claim 11, wherein the multi-view representation includes inferred vehicle information associated with the one or more additional viewpoints that provides a global view of the vehicle.

13. The method of claim 12, wherein a conditional generative adversarial network is utilized to infer the vehicle information that is used to generate the multi-view representation of the vehicle.

14. The method of claim 13, wherein the conditional generative adversarial network comprises a generative neural network and a discriminative neural network that compete against one another to generate the multi-view representation of the vehicle.

15. The method of claim 14, wherein the conditional generative adversarial network is trained using a second generative neural network that utilizes real image data of vehicles.

16. The method of claim 11, wherein comparing the multi-view representation to vehicles identified in previously captured images includes utilizing a pairwise distance metric learning function to compute distance metrics indicating a similarity between the vehicle in the image and the vehicles identified in the previously captured images.

17. The method of claim 11, wherein the attention maps are generated, at least in part, using an attention model that enables identification of context vectors indicating the overlapping visual patterns of the vehicle between the identified viewpoint and the one or more additional viewpoints.

18. The method of claim 11, wherein a trained neural network is used to extract vehicle features from the image, including features that identify a color of the vehicle, a model of the vehicle, and a type of the vehicle.

19. The method of claim 18, wherein:
the trained neural network comprises a convolutional neural network that is trained using vehicle attribute labels; and
the convolutional neural network is utilized to train an attention model that is used to generate the attention maps.

20. The method of claim 11, wherein the method for re-identifying the vehicle is utilized in connection with a surveillance system or a transportation system.

* * * * *